US012654173B2

(12) United States Patent
Mark et al.

(10) Patent No.: US 12,654,173 B2
(45) Date of Patent: Jun. 16, 2026

(54) ROLL FRAME WITH IMPROVED PRODUCT COLLECTION

(71) Applicant: Bühler AG, Uzwil (CH)

(72) Inventors: Daniel Mark, Wil (CH); Daniel Rickenbach, Wittenwil (CH); Stefan Salzmann, Rapperswil (CH); Daniel Doerig, Frauenfeld (CH); Beno Chialina, Henau (CH)

(73) Assignee: Bühler AG, Uzwil (CH)

( * ) Notice: Subject to any disclaimer, the term of this patent is extended or adjusted under 35 U.S.C. 154(b) by 390 days.

(21) Appl. No.: 18/252,966

(22) PCT Filed: Nov. 19, 2021

(86) PCT No.: PCT/EP2021/025453

§ 371 (c)(1),
(2) Date: May 15, 2023

(87) PCT Pub. No.: WO2022/106062

PCT Pub. Date: May 27, 2022

(65) Prior Publication Data

US 2023/0415162 A1 Dec. 28, 2023

(30) Foreign Application Priority Data

Nov. 20, 2020 (EP) .................................... 20208848

(51) Int. Cl.
*B02C 4/28* (2006.01)
*B02C 4/06* (2006.01)

(52) U.S. Cl.
CPC . *B02C 4/28* (2013.01); *B02C 4/06* (2013.01)

(58) Field of Classification Search
CPC .... B02C 4/00; B02C 4/02; B02C 4/28; B02C 4/06
See application file for complete search history.

(56) References Cited

U.S. PATENT DOCUMENTS

| | | | | |
|---|---|---|---|---|
| 2,717,124 | A | 9/1955 | Fielden et al. | |
| 2,804,998 | A * | 9/1957 | Kirschmann .......... | A01C 15/16 222/615 |
| 2,994,485 | A * | 8/1961 | Elwick ...................... | B02C 4/06 241/222 |

FOREIGN PATENT DOCUMENTS

| | | | | | |
|---|---|---|---|---|---|
| DE | 102015118355 | A1 * | 4/2017 | ............... | A01C 7/16 |
| EP | 0944433 | A1 | 9/1999 | | |
| EP | 0991473 | A1 | 4/2000 | | |
| GB | 687322 | A * | 2/1953 | ............... | B02C 4/06 |
| WO | 2019/224399 | A1 | 11/2019 | | |
| WO | 2019/229014 | A2 | 12/2019 | | |

* cited by examiner

*Primary Examiner* — Bobby Yeonjin Kim
(74) *Attorney, Agent, or Firm* — Colson Law Group, PLLC

(57) ABSTRACT

The present invention relates to a roll frame, comprising a product inlet, a grinding chamber with grinding rolls, into which grinding chamber bulk material to be ground can pass from the product inlet, and a product outlet unit which is arranged below the grinding chamber and into which product from the grinding chamber can pass, wherein the product outlet unit comprises a hopper which has a conveying worm in its lower region which is remote from the grinding chamber, wherein the conveying worm has two portions which convey in opposite directions, in order to convey product out of the lower region of the hopper to an outlet opening in the bottom region of the hopper.

12 Claims, 4 Drawing Sheets

ROLL FRAME WITH IMPROVED PRODUCT COLLECTION

The present invention relates to a roll frame for the production of foodstuffs and animal feed with improved product collection.

Figure 1:
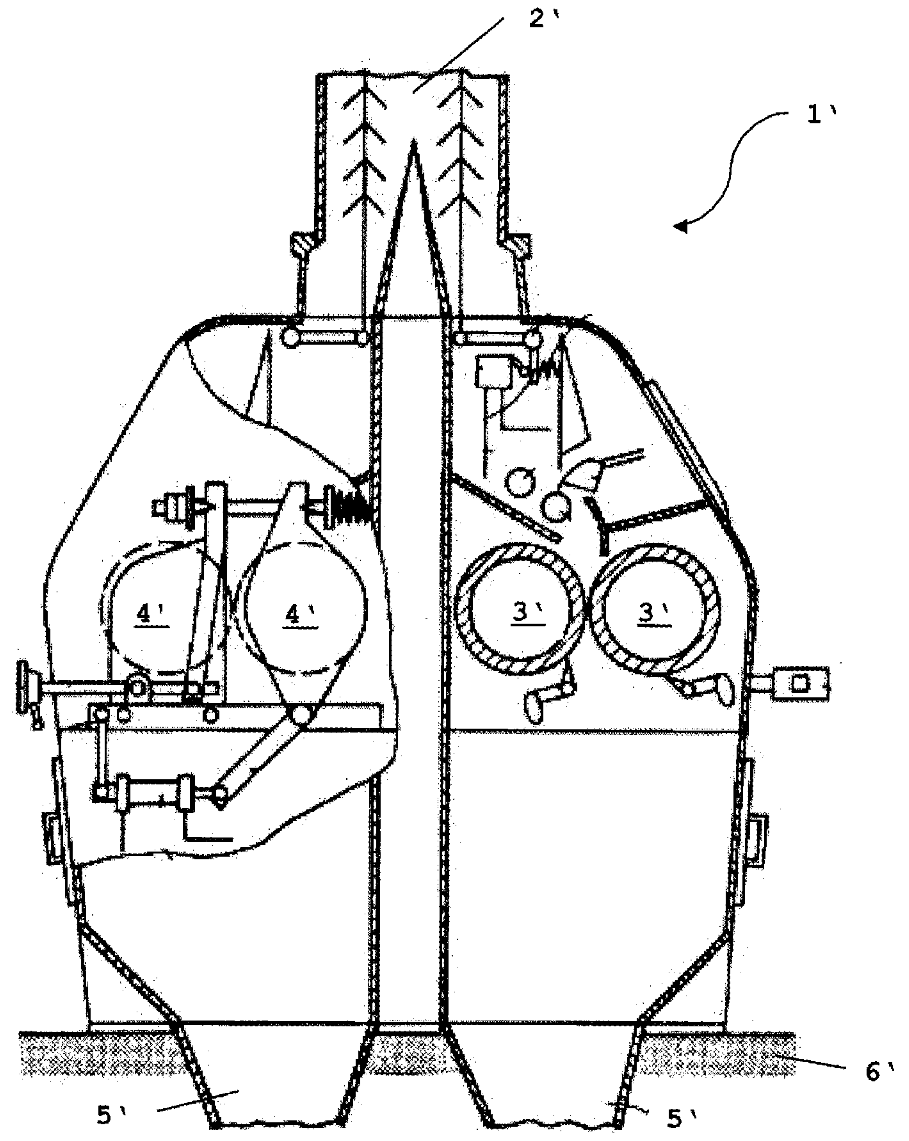
Fig. 1 (prior art)

Roll frames and their application are well known. An exemplary roll frame under the prior art is shown in FIG. 1, with only the most important components identified in more detail. The roll frame 1' comprises an inlet 2' (for example, a hopper) through which the material to be ground is fed to pairs of rolls 3' and 4'. The ground material then leaves the roll frame 1' through hoppers 5', into which it falls due to gravity. The hoppers 5', which can be discharge funnels, for example, are guided by a base 6' on which the roll frame 1 is arranged. Below the base 6', the hoppers 5' open into a discharge device (not shown) with which the material is further conveyed on mechanically or pneumatically.

Such a roll frame has some disadvantages. Since the hoppers 5' protrude through the base 6' on which the roll frame 1' is located, an additional building floor must be provided below the base 6', in which the discharge device described above can be arranged.

Roll frames with which the product is conveyed away via direct extraction are also known. With such roll frames, two collection hoppers for the product are arranged per roll frame side within the roll frame. Subsequently, a suction-pneumatic discharge is arranged for each collection hopper; i.e., four riser pipes are to be provided. In addition, in the case of larger roll frames (for example, a length of 1500 mm), indentations are to be provided in the base on which the roll frame stands for the collection hoppers.

In U.S. Pat. No. 2,717,124, a roll frame with a closed hopper was described. A suction pipe is guided into the hopper, into which the product is sucked and conveyed away upwards by the roll frame.

None of the variants under the prior art can achieve constant product discharge with large mass flows.

It was the object of the present invention to overcome the disadvantages described above and to provide a roll frame for the production of foodstuffs and animal feed, with which a constant product discharge can be achieved even with large mass flows.

The present object is achieved by the roll frame for the production of foodstuffs and animal feed according to the invention.

The present invention relates to a roll frame for the production of foodstuffs and animal feed, comprising a product inlet, a grinding chamber with grinding rolls, into which grinding chamber bulk material to be ground can pass from the product inlet, and a product outlet unit which is arranged below the grinding chamber and into which product out of the grinding chamber can pass, characterized in that the product outlet unit comprises a hopper which has a conveying worm in its lower region which is remote from the grinding chamber, wherein the conveying worm has two portions which convey in opposite directions, in order to convey product out of the lower region of the hopper to an outlet opening in the bottom region of the hopper.

The present invention is characterized by a particular product outlet unit. This product outlet unit comprises a hopper. Hoppers and their use in roll frames are well known. According to the invention, a hopper is a prismatic unit with a substantially triangular cross-section, wherein the base area is oriented towards the grinding chamber and the end which is remote from the base area may be rounded.

According to a preferred embodiment of the present invention, the roll frame for the production of foodstuffs and animal feed according to the invention has a single hopper, which extends over the entire width of the roll frame. Particularly preferably, the base area of such hopper is completely open with respect to the grinding chamber of the roll frame, such that ground product out of the grinding chamber can enter the hopper over the entire width of the hopper.

Alternatively, multiple corresponding hoppers may be arranged next to one another and together extend across the entire width of the roll frame.

In its lower region, which is remote from the grinding chamber, the hopper has a conveying worm, i.e., at the end which is remote from the base area. According to a preferred embodiment of the present invention, the end of the hopper which is remote from the base area is rounded, in order to optimally accommodate the conveying worm.

The conveying worm extends over the entire length of the lower region of the hopper. It is rotatably mounted at the two lateral ends of the hopper. A motor for moving the conveying worm is operatively connected to the conveying worm. Preferably according to the invention, the motor is arranged at a lateral end of the hopper, preferably detachably fastened. According to the invention, any motor typically used for the movement of conveying worms can be used. Preferably, the motor is a geared motor, and more preferably an electric motor.

The conveying worm arranged in the hopper has two portions which convey in opposite directions. For example, on one portion of the conveying worm, worm elements, which effect product conveyance from left to right, are arranged, while in another portion of the conveying worm, worm elements, which effect product conveyance from right to left, are arranged.

The provision of two portions which convey in opposite directions of the conveying worm is used to convey product out of the bottom region of the hopper to an outlet opening in the bottom region of the hopper. With the aid of the portions which convey in opposite directions of the conveying worm, product is conveyed to the outlet opening from regions of the hopper located on both sides of the outlet opening.

The worm elements are arranged at least in the region of the hopper, which is open to the grinding chamber. According to the preferred embodiment of the invention, the base area of this hopper is completely open with respect to the grinding chamber of the roll frame, such that ground product out of the grinding chamber can enter the hopper over the entire width of the hopper. According to this embodiment, worm elements are arranged over the entire width of the hopper, except for the region in which the outlet opening is located.

In accordance with the invention, it is particularly preferred that the portions which convey in opposite directions of the conveying worm are connected to one another via a non-interrupted shaft, i.e., that only a single conveying worm is provided. Compared to a variant with which two separate, conveying worms which convey in opposite directions would be provided in the hopper, a single conveying worm is subject to significantly fewer vibrations.

As explained above, product falling into the hopper is conveyed with the aid of the conveying worm from both lateral regions of the hopper to a single outlet opening. Such outlet opening has dimensions that ensure continuous discharge of the product out of the hopper even in mass flow operation, without clogging or blockages. The exact dimensions may be determined by a specialist as a matter of routine.

The outlet opening is particularly preferably located in the center of the bottom area of the hopper; i.e., it is equidistant from both lateral ends of the hopper. However, it is also possible to locate the outlet opening at a certain distance from the center of the bottom area of the hopper, for example, in the middle third of the longest dimension of the bottom area (referred to here as the width) of the hopper.

According to another preferred embodiment, a component can be provided in the region of the outlet opening to prevent product accumulation in this region. For example, this can be a pin.

The outlet opening opens into a pipeline; i.e., the outlet opening is connected to a pipeline arranged below the outlet opening. The product is conveyed away from the roll frame through such pipeline.

According to the invention, the outlet opening is preferably connected to the pipeline in such a way that the product passes from the outlet opening into the pipeline with the smoothest possible deflections. This reduces the risk of clogging or blockage of the outlet opening. Preferably, the outlet opening is designed in the form of a so-called feeder shoe, with which an opening in the bottom region of the hopper is connected to an opening in the top region of the pipeline via vertical or slightly inclined or curved side walls. With this embodiment, a transfer of product out of the hopper to the pipeline is provided in a substantially vertical direction.

In this respect, it is preferred according to the invention that the pipeline is arranged at an angle of approximately 90° to the hopper; i.e., in the region of the outlet opening, an imaginary line along the longest dimension (i.e., the width) of the hopper and an imaginary central axis through the pipeline line up in such a way that they enclose an angle in the range of 60° to 120°, particularly preferably 90°.

The pipeline for conveying the product away from the roll frame is constructed analogously to conventional pipelines for discharging product away from a roll frame. Preferably, the product is discharged pneumatically, particularly preferably suction-pneumatically. In this case, the pipeline is preferably connected to a unit for extracting air. Such units are known and need not be explained in detail here.

According to one embodiment of the invention, the pipeline is arranged in a portion below the hopper and has an upward bend beyond the hopper, in order to be guided upward laterally past the hopper. The pipeline thus has a portion arranged vertically upwards, which is connected via a bent element to the portion of the pipeline arranged below the hopper.

According to a preferred embodiment, the pipeline is arranged on the hopper in a demountable manner, for example with one or more screw connections. The pipeline can also have further fastening means for fastening to the roll frame itself, for example one or more further screw connections.

The present invention allows the product to be discharged without providing additional construction height within the machine. The roll frame can be placed directly on the base. It is not necessary to provide an additional building floor as required by the prior art.

Moreover, according to the invention, in the case of a roll frame for the production of foodstuffs and animal feed with direct extraction, the number of hoppers required can be reduced to one hopper per side (and correspondingly one pneumatic pipeline per side).

The present invention thus provides significant advantages in terms of apparatus technology.

In principal, the product outlet unit according to the invention can be used with any conventional roll frame. However, the preferred use is for roll frames for the production of foodstuffs and animal feed. The present invention thus relates to a product outlet unit, comprising a hopper having a conveying worm in its lower region which is remote from its base area, wherein the conveying worm has two portions which convey in opposite directions in order to convey product out of the lower region of the hopper to an outlet opening in the bottom region of the hopper.

The product outlet unit according to the invention is constructed as described above.

Depending on the design of the roll frame, the roll frame can have one or two of the product outlet units according to the invention.

The roll frame according to the invention for the production of foodstuffs and animal feed is preferably used for the production of flour from cereals and from the processing of cereal milling products and cereal end products of the milling industry (in particular the milling of soft wheat, durum, rye, corn and/or barley) or the special milling industry (in particular the hulling and/or milling of soy, buckwheat, barley, spelt, millet/sorghum, pseudocereals and/or pulses), wherein this is in particular common wheat, durum wheat, corn or buckwheat. Common wheat is also known as *Triticum aevestivum* and durum wheat as *Triticum durum*. For the purposes of the application, rice is also understood to be a cereal. The roll frame according to the invention is further suitable for the production of feed for farm and domestic animals, fish and crustaceans.

The roll frame is characterized by at least one grinding mill. Such roll frames are known, for example, from EP-0 944 433 A1, EP-0 991 473 A1, WO 2019/224 399 A1 and WO 2019/229 014 A1, the corresponding contents of which are referred to.

The present invention further relates to a method for grinding bulk material with a roll frame according to the invention, comprising the steps of a) Feeding of bulk material into the product inlet;
b) Grinding of the bulk material in the grinding chamber with the aid of the grinding rolls and transfer of the ground product into the hopper;
c) Conveying of the ground product through the conveying worm arranged in the hopper to an outlet opening.

The introduction of bulk material into the product inlet and the grinding of the bulk material in the grinding chamber with the aid of the two grinding rolls is carried out in the usual and known manner analogous to the method in conventional roll frames.

Subsequently, the ground product is transferred to the hopper of the roll frame according to the invention. This is effected by the influence of gravity, as the product falls from the grinding chamber through the open base area of the hopper into the hopper.

In the hopper, the conveying of the ground product is performed by the conveying worm arranged in the hopper to an outlet opening, as described above. The portions which convey in opposite directions of the conveying worm cause the product to be conveyed to the outlet opening from both regions to the side of the outlet opening in the base of the hopper.

The product conveyed into the outlet opening is transferred to the pipeline. As described above, this is preferably effected with the smoothest possible deflections; i.e., the direction of movement of the product changes as little as possible during the transfer. There is only a merging of the product from the left and right into the center of the hopper. From there, it leaves the hopper downward (horizontal movement is converted into vertical movement, or via the inclined geometry of a feeder shoe) into the pipeline of the suction pneumatics. This is preferably achieved with the aid of the feeder shoe described above.

In the pipeline, the product is conveyed away from the roll frame as described above. Preferably this is effected pneumatically, particularly preferably suction-pneumatically.

Figure 2:
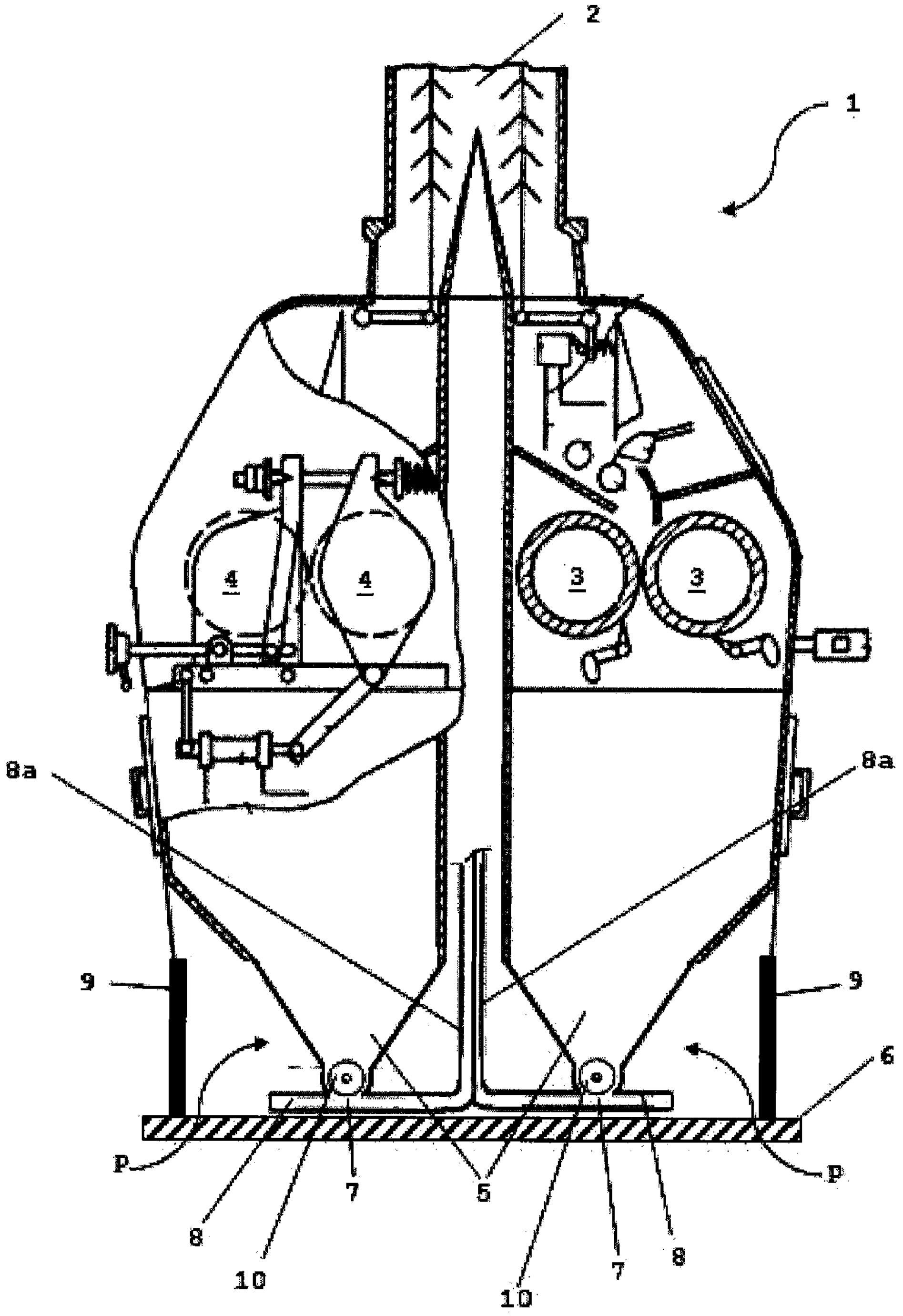
Figure 3:
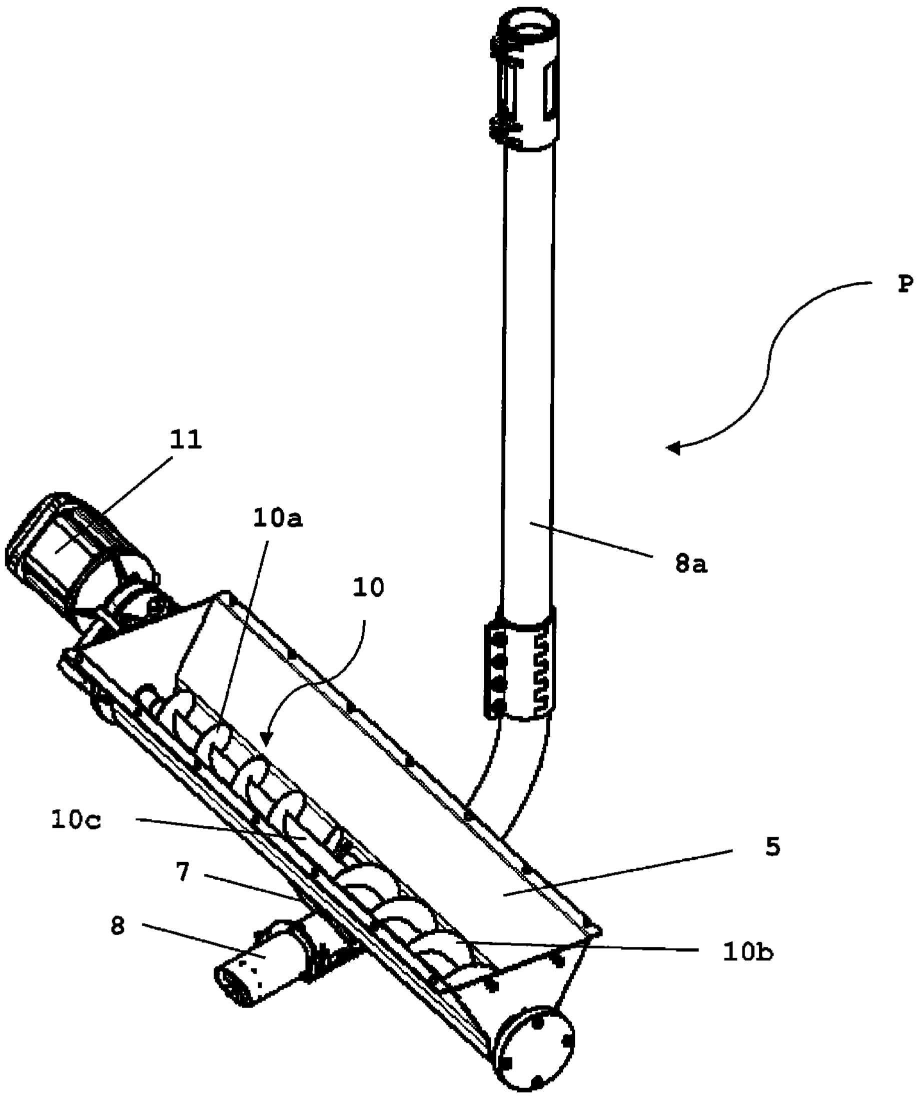
Figure 4:
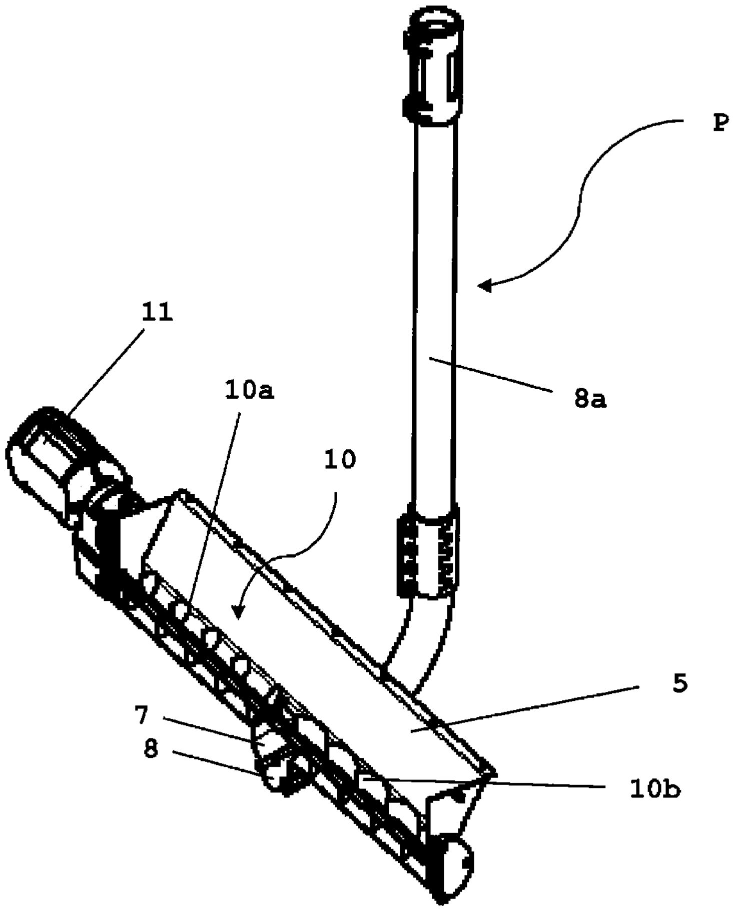

The present invention is explained in more detail below with reference to non-restrictive drawings and preferred embodiments. In the figures:

FIG. 1 shows a schematic view of a roll frame from the prior art for the production of foodstuffs and animal feed FIG. 2 shows a schematic view of a roll frame for the production of foodstuffs and animal feed according to the invention FIG. 3 shows a schematic view of the product outlet unit according to the invention FIG. 4 shows a further schematic view of the product outlet unit according to the invention FIG. 1 shows a schematic view of a roll frame under the prior art for the production of foodstuffs and animal feed, with only the most important components identified in more detail. The roll frame 1' comprises an inlet 2' (for example, a hopper) through which the material to be ground is fed to pairs of rolls 3' and 4'. The ground material then leaves the roll frame 1' through hoppers 5', into which it falls due to gravity. The hoppers 5', which can be discharge funnels, for example, are guided by a base 6' on which the roll frame 1 is arranged. Below the base 6', the hoppers 5' open into a discharge device (not shown) with which the material is further conveyed on mechanically or pneumatically.

FIG. 2 shows a schematic view of a roll frame 1 according to the invention for the production of foodstuffs and animal feed, with only the most important components identified in more detail. The roll frame 1 comprises an inlet 2 (for example, a hopper) through which the material to be ground is fed to pairs of rolls 3 and 4. The ground material then leaves the roll frame 1 through hoppers 5, into which it falls due to gravity. The hoppers 5 have an outlet opening 7 in the form of a feeder shoe in their center, through which product enters the pipeline 8. The components 5, 7 and 8 together each form a product outlet unit P. The pipelines 8 of the two hoppers shown in FIG. 2 are arranged such that the vertical region 8*a* of one of the pipelines 8 is adjacent to the vertical region 8*a* of the other pipeline 8.

The roll frame 1 stands on base 6 with the aid of legs 9.

FIG. 3 shows a schematic view of the product outlet unit P according to the invention. A conveying worm 10 is arranged in the hopper 5, which conveying worm has a portion 10*a* conveying from left to right and a portion 10*b* conveying from right to left. Between such portions 10*a* and 10*b*, there is a portion 10*c* without worm elements in the region of the outlet opening 7. The conveying worm 10 is rotatably mounted at the lateral ends of the hopper 5. The conveying worm 10 is connected to a motor 11, through which it is driven. The pipeline 8 runs horizontally below the hopper. Behind the hopper 5, the pipeline 8 has a bend and passes into a vertical region 8*a*.

FIG. 4 shows a longitudinal section through the product outlet unit P according to FIG. 3, where the same reference signs indicate the same components. FIG. 4 shows the shape of the feeder shoe 7, which connects the opening in the base of the hopper 5 to the opening in the top of the pipeline 8 in such a way that the product is transferred from the hopper 5 to the pipeline 8 with the smoothest possible deflections.

The invention claimed is:

1. A roll frame for the production of foodstuffs and animal feed, comprising a product inlet, a grinding chamber with grinding rolls, into which grinding chamber bulk material to be ground can pass from the product inlet, and a product outlet unit which is arranged below the grinding chamber and into which product from the grinding chamber can pass, wherein the product outlet unit comprises a hopper having a conveying worm in its lower region which is remote from the grinding chamber, wherein the conveying worm has two portions which convey in opposite directions, in order to convey product out of the lower region of the hopper to a single outlet opening in the bottom region of the hopper, the single outlet opening configured for continuous product discharge during mass flow operation.

2. The roll frame according to claim 1, wherein the outlet opening is arranged in the center of the hopper.

3. The roll frame according to claim 1, wherein the outlet opening is connected to a pipeline arranged below the outlet opening.

4. The roll frame according to claim 1, wherein the outlet opening is connected to the pipeline in such a way that product passes from the outlet opening into the pipeline by way of a feeder shoe having substantially vertical walls to minimize deflections and prevent clogging.

5. The roll frame according to claim 1, wherein the hopper has an opening to the grinding chamber over its entire width.

6. The roll frame according to claim 1, wherein the conveying worm extends over the entire length of the lower region of the hopper and the portions which convey in opposite directions of the conveying worm are connected to one another via a non-interrupted shaft.

7. The roll frame according to claim 1, wherein the pipeline is connected to a unit for sucking in air.

8. The roll frame according to claim 1, wherein the pipeline has a portion arranged vertically upwards, which is connected via a bent element to the portion of the pipeline arranged below the hopper.

9. The roll frame according to claim 1, wherein the pipeline is arranged on the hopper in a demountable manner.

10. A method for grinding bulk material with a roll frame for the production of foodstuffs and animal feed according to claim 1, comprising the steps of a) feeding of bulk material into the product inlet;

b) grinding of the bulk material in the grinding chamber with the aid of the grinding rolls and transfer of the ground product into the hopper; and, c) conveying the ground product through the conveying worm arranged in the hopper to an outlet opening.

11. The method according to claim 10, wherein the ground product is transferred through the outlet opening into a pipeline and conveyed away therein.

12. The method according to claim 11, wherein the conveying in the pipeline is carried out pneumatically, via an inclined geometry of a feeder shoe to transfer the ground product from the single outlet opening to the pipeline.

* * * * *